United States Patent [19]

Schlaeppi

[11] 3,820,032

[45] June 25, 1974

[54] DIGITAL CIRCUIT FOR USE AS A FREQUENCY-TO-DC TRANSDUCER

[75] Inventor: Hans P. Schlaeppi, Chappaqua, N.Y.

[73] Assignee: International Business Machines Corporation, Armonk, N.Y.

[22] Filed: June 30, 1972

[21] Appl. No.: 267,809

[52] U.S. Cl. .................. 328/133, 307/233, 307/243, 307/268, 307/269, 307/293, 307/295, 328/140

[51] Int. Cl. .............................................. H03b 3/04

[58] Field of Search ........... 307/295, 232, 233, 269, 307/293, 243, 268; 328/140, 134

[56] References Cited

UNITED STATES PATENTS

| | | | |
|---|---|---|---|
| 3,038,130 | 6/1962 | Gordon | 332/9 |
| 3,200,340 | 8/1965 | Dunne | 328/63 |
| 3,280,937 | 10/1966 | Faber et al. | 181/.5 |
| 3,408,581 | 10/1968 | Wakamoto et al. | 329/50 |
| 3,466,550 | 9/1969 | Wolf et al. | 328/140 |
| 3,478,178 | 11/1969 | Grace | 179/100.2 |
| 3,514,698 | 5/1970 | Rey | 324/79 |
| 3,663,885 | 5/1972 | Stewart | 328/140 |
| 3,671,876 | 6/1972 | Oshiro | 328/134 |
| 3,723,764 | 3/1973 | Sharp | 307/233 |
| 3,735,218 | 5/1973 | Kunert | 328/134 |
| 3,736,516 | 5/1973 | Ellis | 328/134 |
| 3,750,035 | 7/1973 | Crow | 328/133 |

FOREIGN PATENTS OR APPLICATIONS

| | | |
|---|---|---|
| 1,228,993 | 4/1971 | Great Britain |

OTHER PUBLICATIONS

R. Zimmerman, "Measuring Freq. Deviation," Electronic Industries, June 1965, p. 100–101.

*Primary Examiner*—Rudolph V. Rolinec
*Assistant Examiner*—Joseph E. Clawson, Jr.
*Attorney, Agent, or Firm*—John J. Goodwin; Graham S. Jones, II

[57] ABSTRACT

A digital system for converting the repetition rate (frequency) of an input signal into a proportional analog output signal, either in a single-ended or in a differential mode, is described. Basically, the system operates by generating exactly one square pulse for each recurrence of the input signal waveform. The duration of the output pulse is controlled by the repetition rate (frequency) of a timing source external to the frequency-to-DC converter, and the output amplitude is controlled by an external reference source. Thus, duration and amplitude of the output waveform are substantially independent of voltage and frequency fluctuations of the input signals, and of drifts in the converter circuit. Moreover, in the differential arrangement, drifts of the common external frequency and voltage references tend to cancel.

4 Claims, 3 Drawing Figures

DIGITAL CIRCUIT FOR USE AS A FREQUENCY-TO-DC TRANSDUCER

BACKGROUND OF THE INVENTION

1. Field of the Invention

The present invention relates to frequency to-fixed-length-pulse square wave and/or frequency-to-DC conversion and more particularly to a frequency to-fixed-length pulse square wave and/or frequency-to-DC transducer having a single external time-base.

2. Prior Art

Frequency to DC converter circuits exist in the prior art. Conventional frequency to DC transducers depend on synchronization of their internal time-bases, for example RC-circuits or monostable multivibrators, with the signals whose frequencies are being measured or compared. The present invention is distinct from the prior art in at least one respect in that the present invention does not depend or rely on synchronization with the signal frequency.

SUMMARY OF THE INVENTION

An object of the present invention is to provide a frequency-to-fixed-length square wave and/or-DC conversion system having a time-base external to the basic frequency-to-fixed-length square wave and/or-DC transducer.

Another object of the present invention is to provide a frequency-to-fixed-length square wave and/or-DC conversion system having single-ended transducers with time-bases of arbitrarily high precision.

A further object of the present invention is to provide a frequency-to-fixed-length square wave and/or-DC conversion system having differential transducers which can be compensated to time-base drift and can employ common simplified time-base circuitry.

Still another object of the present invention is to provide a frequency-to-DC conversion system wherein there is no need to synchronize the time-base generator with the signal whose frequency is to be measured, thereby permitting the use of a free-running time-base and allowing several transducers to share a common time-base.

In accordance with this invention, a digital system for a single time-base frequency-to-DC converter that can be used with either a single-ended or differential mode of transducer is provided. The frequency signal to be measured, in the form of a train of voltage pulses, is applied as an input signal to the digital system which incorporates an external time-base and the output signal is a stream of square wave pulses the duration and amplitude of which are substantially independent of voltage and frequency fluctuations of the input signal. The output signal can be passed through a low pass filter to obtain a DC voltage which is a measure of the applied pulse frequency. Alternatively, the output can be used to gate a voltage reference to the low pass filter to eliminate the effect of supply and component drifts from the analog output signal representing the frequency measurement. Also, the effects of timing drifts are eliminated by employing a stable external oscillator to generate the timing signal that determines the duration of the output pulses of the circuit.

In accordance with a second aspect of the invention the system functions as an inherently drift-free frequency discriminator, employing two of the basic circuits described above and capable of generating an error signal when the frequencies of the two applied pulse trains differ.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

In many regulating and control systems it is necessary to convert the frequency of a signal into a proportional DC signal in a manner that guarantees high long term stability. Stability is especially important in difference measurements, for example, in a precision servomechanism that is to maintain the speed of one rotating shaft closely at the speed of another shaft. Conventionally, analog methods are used to convert the rotational frequency of each shaft into a proportional DC signal; and the two signals are subtracted to form the error signal. This approach creates a stability problem, in that small fluctuations in the conversion factor of one transducer result in relatively large variations of the error signal.

In order to minimize the instability of frequency-to-DC transducers, one or several of the following steps have to be taken: reduce the number of parameters affecting the conversion factor, minimize the sensitivity of the conversion factor on each of the remaining parameters and, in case pairs of transducers are used in a differential arrangement, ensuring that a sensitive parameter affects both conversion factors in identical direction and magnitude.

Inherent in frequency transducers is a time-base. This time-base is the conversion parameter usually most difficult to stabilize. Analog transducers have time-bases affected by circuit parameter drifts, for example, RC time-constants, which, moreover, inherently cannot be made to compensate in differential arrangements. Digital transducers can be given highly stable time-bases which also lend themselves to drift compensation in differencing, but they are extremely costly equipment and, since they rely on cycle-counting, have inherently slow response. The digital approach does not, by itself, eliminate dependence on voltage levels and the like.

Figure 1:
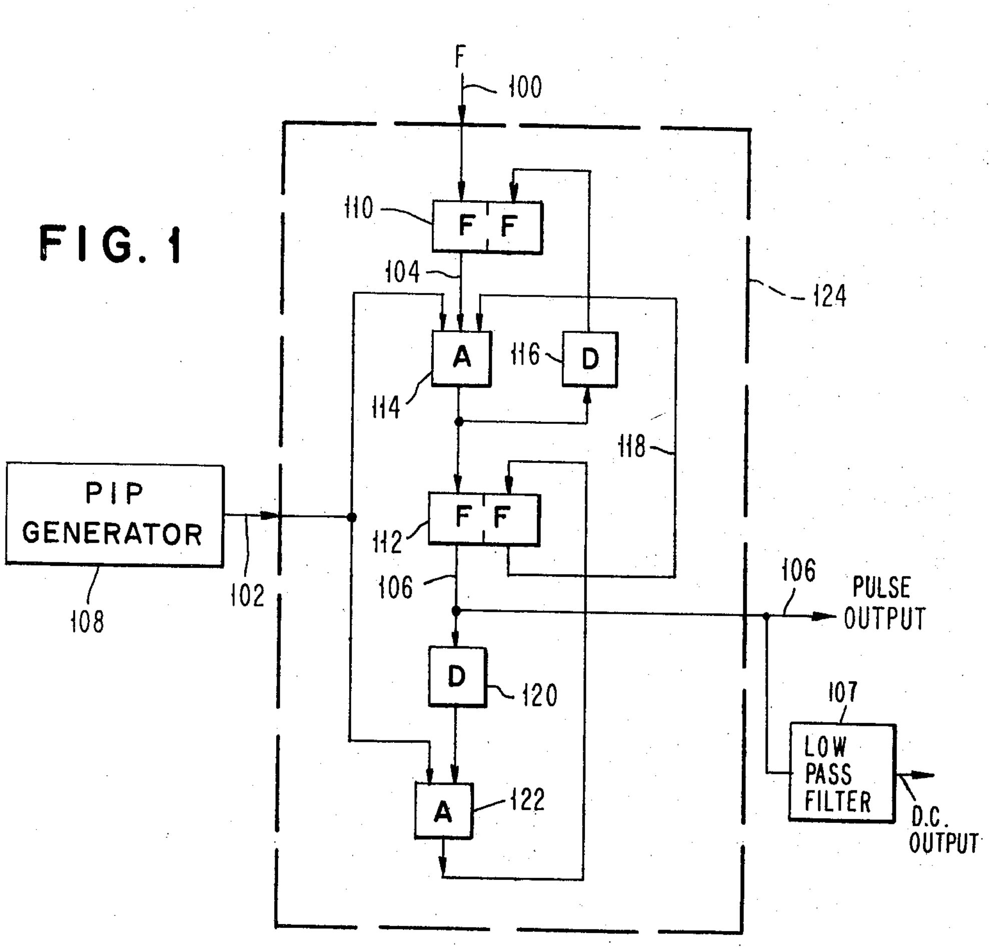
FIG. 1 shows a schematic block diagram of a frequency-to-DC conversion system following the principles of the present invention.
Figure 2:
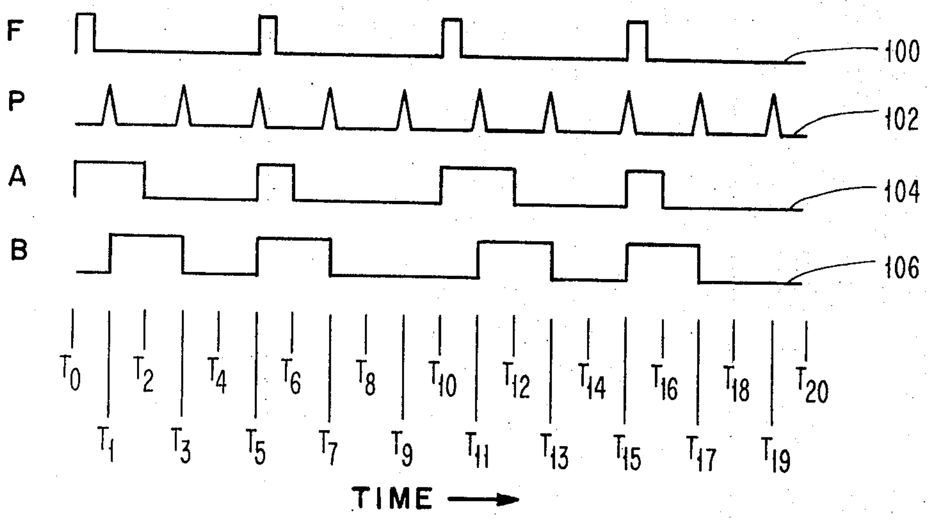
FIG. 2 shows an illustration of a timing chart for the signal waveforms produced by the operation of the system of FIG. 1.

Referring to FIG. 1, an embodiment of frequency-to-fixed-length pulse square wave conversion system is shown which provides an improvement over the aforesaid prior art approaches. In FIG. 1 the basic circuit is shown enclosed by the dotted lines indicated by reference number 124. The system of FIG. 1 will be explained in connection with the timing charts illustrated in FIG. 2 wherein time intervals $T_0$ through $T_{20}$ are indicated. The uppermost series of pulses labeled F in FIG. 2 represent the input signal. The pulses labeled P are a series of "pip" pulses from pip generator 108 in FIG. 1. The pulses labeled A in FIG. 2 represent the output signals from flip-flop circuit 110 in FIG. 1 and the pulses labeled B are the output signals from flip-flop circuit 112 on lead 106 in FIG. 1.

In FIG. 1 the input signal pulses F, whose frequency is to be converted are applied to lead 100 and these pulses are shown as occurring at times $T_0$, $T_5$, $T_{10}$, and $T_{15}$ spaced equally apart representative of a single frequency in FIG. 2. A "pip" generator 108 applies trigger pulses P to line 102 and these pulses are shown as occurring at times $T_1$, $T_3$, $T_5$, $T_7$, $T_9$, $T_{11}$, $T_{13}$, $T_{17}$ and $T_{19}$ in FIG. 2. The pip frequency should be substantially greater than the input signal pulse frequency F.

The F input pulse signal on line 100 is applied to flip-flop circuit 110 and the pip pulses P on lead 102 are applied to a three-way And circuit 114. The output of And circuit 114 is connected to one side of flip-flop circuit 112. Both flip-flop circuits 110 and 112 are in their "0" state just prior to time $T_0$. Therefore, the F pulses which occurs at $T_0$ sets flip-flop circuit 110 to its "1" state providing an output signal on line 104 to And 114. Because flip-flop circuit 112 is in its "0" state, so that line 118 is energized by the flip flop 112, providing a second signal to a second input of AND 114 the P pulse on lead 102 that occurs at $T_1$ will pass through the third input of AND circuit 114 to set flip-flop circuit 112 to its "1" state. The output signal from And circuit 114 is also applied to and passes through a delay circuit 116 and it resets flip-flop circuit 110 to its "0" state a predetermined interval after time $T_1$ which is time $T_2$ in this case. The delay of delay circuit 116 must be greater than the maximum duration of the F pulse for proper operation.

Because flip-flop circuit 112 is now in its "1" state, there will now be no signal on lead 118 and And circuit 114 will therefore be disabled. Also, since flip-flop circuit 112 is switched to its "1" state the leading edge of a square wave signal (B pulse) will appear on the output lead 106 at time $T_1$. This waveform is connected to a delay circuit 120 which delays the effect of the waveform at its output; and thus the And circuit 122 having its inputs connected to the output of delay circuit 120 and line 102 of pip generator 108 is not enabled at time $T_1$ when the pip pulse P occurs on lead 102.

The next occurrence of a pip (P) pulse on lead 102 at time $T_3$ will, however, pass through And circuit 122 and will reset flip-flop circuit 112 to its "0" state thus terminating the square wave "B" pulse on lead 106. In this manner output B pulses are produced, the duration of which is solely determined by the frequency of pip generator 108. At certain points in time such as at time $T_5$ in FIG. 2, F signal pulses on lead 100 and P pulses on lead 102 will overlap. Consequently, flip-flop circuit 110 will be set to its "1" state and flip-flop circuit 112 will also be set to its "1" state. Thus, the second output B pulse will start at time $T_5$. Flip-flop circuit 110 will be reset to its "0" state shortly after time $T_5$ and flip-flop circuit 112 will be reset to its "0" state at time $T_7$. Thus, it is seen that the circuit of FIG. 1 operates correctly even when overlap occurs. Line 106 is connected to a low pass filter 107 to obtain a DC voltage which is a measure of the applied pulse frequency, since the time average of the fixed length pulses B (measured by the interval between pips P) occurring at frequency F is an analogue measurement of the frequency F in terms of voltage amplitude.

From the foregoing description it should be understood how the third and fourth output B pulses in FIG. 2, and all succeeding output pulses are generated since the circuit of FIG. 1 continues to operate in the same manner as described.

Figure 3:
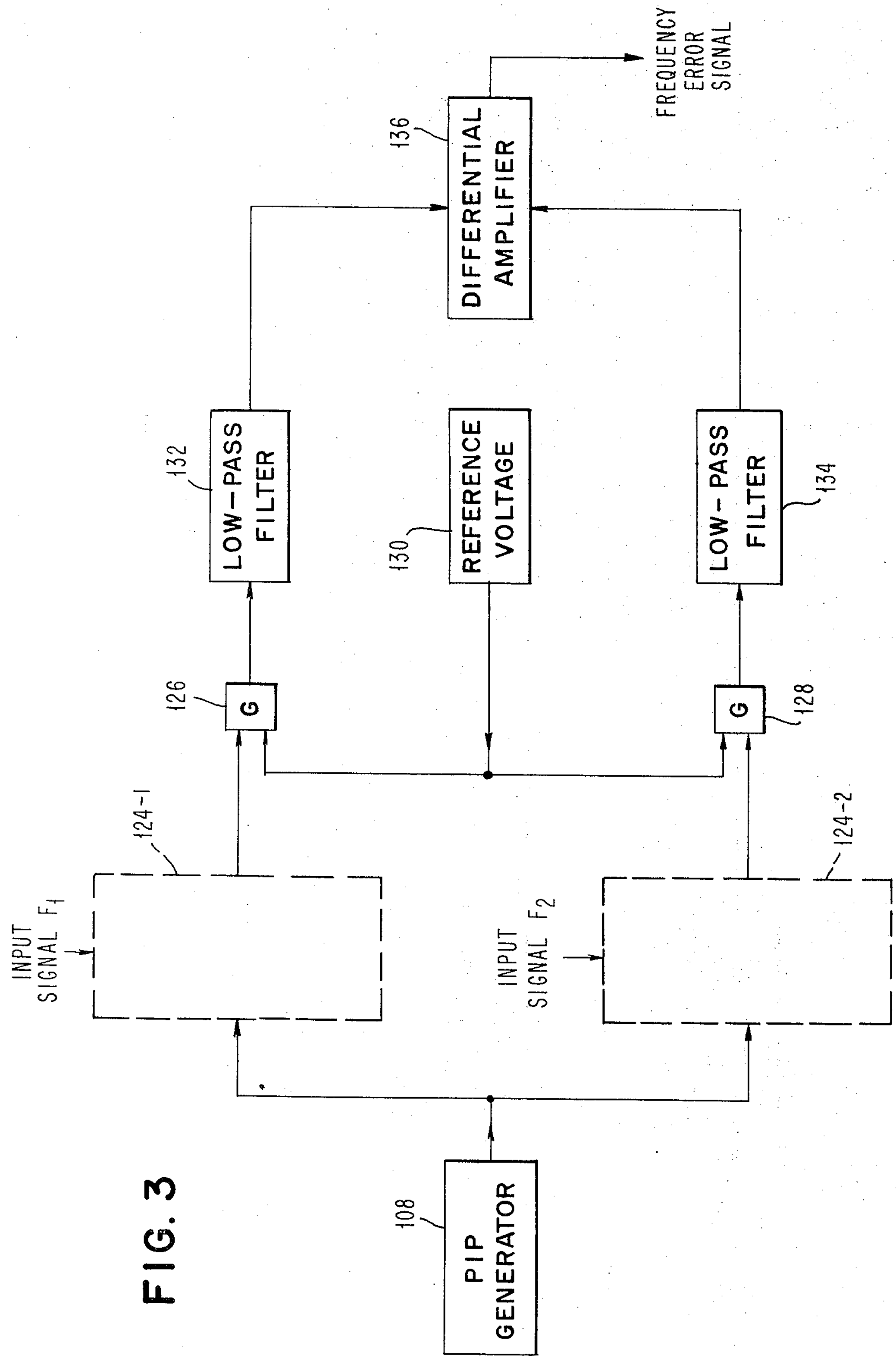
FIG. 3 shows a schematic block diagram of an embodiment of the present invention adapted for use as a differential tachometer.

Two circuits as shown in FIG. 1 can be employed in combination to provide a digital differential tachometer or frequency discriminator device which may be used in regulating and control systems. Referring to FIG. 3 a system is shown wherein the dotted lined boxes 124-1 and 124-2 represent the same circuit 124 described in detail in reference to FIG. 1. One of the circuits 124-1 receives input signal pulses $F_1$ and the other circuit 124-2 receives input signal pulses $F_2$. Both circuits share and are synchronized by the same pip generator 108. The output signal of circuit 124-1 is used to control gate circuit 126 and the output of circuit 124-2 is used to control gate circuit 128. A reference signal source 130 provides a reference voltage which is applied to both gates 126 and 128. The output signal of gate circuit 126, that is, a pulse train derived from frequency signal $F_1$ which is at the reference voltage and then converted to DC when it passes through a low pass filter 132 to provide a DC output signal from filter 132 which is proportional to the frequency of the input signal $f_1$ and is applied to one of the inputs to a differential amplifier 136. The output of gate circuit 128 which is pulse train derived from the input signal $F_2$ at the reference voltage from source 130 passes through a low pass filter 134 producing the DC equivalent of the input signal frequency $F_2$ based upon a time controlled division of the voltage of reference 130 as a function of frequency 130 as a function of frequency F, which is applied to the other input of differential amplifier 136. The output of the differential amplifier is the "frequency error signal." Thus, the effects on the error signal of drift of both the pip frequency and the reference voltage tend to cancel.

What has been described is a digital system for a frequency-to-DC converter with a single external time-base that can be used with either a single-ended or differential transducer. The converter does not depend on synchronization with external the input signal frequency and can be used with time-bases of arbitrarily high precision. Since an external time-base is used, several transducers can share a common time-base. This property is especially important in differential transducers, where it can be used to cancel the effects of time-base drifts, thus permitting the use of simplified time-base circuitry.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A frequency-to-DC square wave converter system comprising

- an input signal having a discrete frequency in the form of a series of signal pulses,
- a first circuit responsive to said input signal for producing a finite duration output signal in response to each of said signal pulses,
- a pulse generator circuit for producing a series of equally spaced timing pulses, and a second circuit responsive to each said finite duration output signal from said first circuit and a concurrent pulse from said pulse generator for initiating an output pulse and further responsive to a subsequent timing pulse from said pulse generator occurring after the duration of said output signal from said first circuit for terminating said output pulse, said second circuit including an And circuit responsive to said output from said first circuit and to said timing pulses from said pulse generator to produce an output gating pulse, and a flip-flop circuit responsive to said output pulse from said gating pulse from said And circuit for terminating said output pulse, and a delay circuit connected between the output of said And circuit and said first circuit for resetting said first circuit to terminate said finite duration output signal therefrom.

2. A frequency-to-square wave converter system comprising an input signal having a discrete frequency in the form of a series of signal pulses, a first circuit responsive to said input signal for producing a finite duration output signal in response to each of said signal pulses, a pulse generator circuit for producing a series of equally spaced timing pulses, and a second circuit responsive to each said finite duration output signal from said first circuit and a concurrent pulse from said pulse generator for initiating an output pulse and further responsive to a subsequent timing pulse from said pulse generator occurring after the duration of said output signal from said first circuit for terminating said output pulse, said first circuit including a first flip-flop circuit responsive to each of said series of signal pulses of said input signal for producing a finite duration output signal, an And circuit connected to said first flip-flop circuit and said pulse generator and responsive to both a finite duration pulse from said first flip-flop and a timing pulse from said pulse generator for producing an output gating pulse, a second flip-flop circuit connected to the output gating pulse of said And circuit for initiating an output pulse, said second flip-flop being reset in response to a subsequent timing pulse from said pulse generator occurring in the absence of an output gating pulse from said And circuit for terminating said output pulse.

3. A frequency-to-fixed-length square wave converter system according to claim 2 further including a delay circuit connected between the output of said And circuit and said first flip-flop circuit to provide a reset pulse to said first flip-flop circuit at a finite time after the occurrence of said output gating pulse from said And circuit.

4. A frequency-to-DC converter system adapted as a digital tachometer including an input signal having a discrete frequency in the form of a series of signal pulses a first circuit responsive to said input signal for producing a finite duration output signal in response to each of said signal pulses, a pulse generator circuit for producing a series of equally spaced timing pulses;

a second circuit responsive to each said finite duration output signal from said first circuit and a concurrent pulse from said pulse generator for initiating an output pulse and further responsive to a subsequent timing pulse from said pulse generator occurring after the duration of said output signal from said first circuit for terminating said output pulse, a first set of said first and said second circuits and a second set of said first and said second circuits connected to a single common clock generator, the input signals of said first set and said second set of circuits having different frequencies, a third circuit connected to the output of said first set of said first and said second circuits, a fourth circuit connected to the output of said second set of said first and said second circuits, a source of reference voltage connected to said third and fourth circuits, a first low pass filter connected to the output of said third circuit, a second low pass filter connected to the output of said fourth circuit, and a differential amplifier connected to the output of said first and second low pass filters for providing a frequency error signal proportional to the difference in frequency between said input signals to said first and second pairs of circuits.

* * * * *